United States Patent
Japikse

(10) Patent No.: US 10,590,951 B2
(45) Date of Patent: *Mar. 17, 2020

(54) STRUCTURES AND METHODS FOR FORCING COUPLING OF FLOW FIELDS OF ADJACENT BLADED ELEMENTS OF TURBOMACHINES, AND TURBOMACHINES INCORPORATING THE SAME

(71) Applicant: Concepts NREC, LLC, White River Junction, VT (US)

(72) Inventor: David Japikse, Woolwich, ME (US)

(73) Assignee: Concepts NREC, LLC, White River Junction, VT (US)

(*) Notice: Subject to any disclaimer, the term of this patent is extended or adjusted under 35 U.S.C. 154(b) by 584 days.

This patent is subject to a terminal disclaimer.

(21) Appl. No.: 15/379,912

(22) Filed: Dec. 15, 2016

(65) Prior Publication Data

US 2017/0097010 A1     Apr. 6, 2017

Related U.S. Application Data

(60) Continuation of application No. 15/093,266, filed on Apr. 7, 2016, now Pat. No. 9,551,225, which is a
(Continued)

(51) Int. Cl.
*F04D 29/44* (2006.01)
*F01D 5/22* (2006.01)
(Continued)

(52) U.S. Cl.
CPC .......... *F04D 29/444* (2013.01); *B23P 15/006* (2013.01); *F01D 5/142* (2013.01);
(Continued)

(58) Field of Classification Search
CPC .......... F01D 9/041; F01D 9/045; F04D 29/24; F04D 29/245; F04D 29/44; F04D 29/444;
(Continued)

(56) References Cited

U.S. PATENT DOCUMENTS 2,029,813 A * 2/1936 De Mey ................ F04D 29/544
                                                    415/119
2,967,013 A * 1/1961 Dallenbach ............. F04D 21/00
                                                    415/181
(Continued)

FOREIGN PATENT DOCUMENTS

CN     101263305 A     9/2008
GB       2034435 A     6/1980
(Continued)

OTHER PUBLICATIONS

Notice of Allowance dated May 3, 2017 in related U.S. Appl. No. 14/749,467, filed Jun. 24, 2015.

*Primary Examiner* — Justin D Seabe
*Assistant Examiner* — Adam W Brown
(74) *Attorney, Agent, or Firm* — Downs Rachlin Martin PLLC

(57) ABSTRACT

Turbomachines having close-coupling flow guides (CCFGs) that are designed and configured to closely-couple flow fields of adjacent bladed elements. In some embodiments, the CCFGs may be located in regions extending between the adjacent bladed elements, described herein as coupling avoidance zones, where conventional turbomachine design would suggest no structure should be added. In yet other embodiments, CCFGs are located upstream and/or downstream of rows of blades coupled to the bladed elements, including overlapping one of more of the rows of blades, to improve flow coupling and machine performance. Methods of designing turbomachines to incorporate CCFGs are also provided.

19 Claims, 12 Drawing Sheets

Related U.S. Application Data division of application No. 14/563,204, filed on Dec. 8, 2014, now abandoned, which is a continuation of application No. 14/162,388, filed on Jan. 23, 2014, now Pat. No. 8,926,276.

(60) Provisional application No. 61/755,747, filed on Jan. 23, 2013.

(51) Int. Cl.

| | |
|---|---|
| *F01D 9/04* | (2006.01) |
| *F04D 29/24* | (2006.01) |
| *F04D 29/54* | (2006.01) |
| *F04D 29/16* | (2006.01) |
| *F04D 29/68* | (2006.01) |
| *B23P 15/00* | (2006.01) |
| *F01D 5/14* | (2006.01) |
| *F01D 25/06* | (2006.01) |
| *F04D 29/28* | (2006.01) |
| *F04D 29/32* | (2006.01) |
| *F04D 29/38* | (2006.01) |
| *F04D 29/66* | (2006.01) |
| *F04D 1/00* | (2006.01) |
| *F04D 17/10* | (2006.01) |

(52) U.S. Cl.
CPC .............. *F01D 5/145* (2013.01); *F01D 5/225* (2013.01); *F01D 9/041* (2013.01); *F01D 9/045* (2013.01); *F01D 25/06* (2013.01); *F04D 1/00* (2013.01); *F04D 17/10* (2013.01); *F04D 29/162* (2013.01); *F04D 29/167* (2013.01); *F04D 29/245* (2013.01); *F04D 29/281* (2013.01); *F04D 29/284* (2013.01); *F04D 29/324* (2013.01); *F04D 29/325* (2013.01); *F04D 29/384* (2013.01); *F04D 29/448* (2013.01); *F04D 29/542* (2013.01); *F04D 29/544* (2013.01); *F04D 29/666* (2013.01); *F04D 29/685* (2013.01); *F05D 2240/121* (2013.01); *F05D 2240/126* (2013.01); *F05D 2240/303* (2013.01); *F05D 2250/52* (2013.01); *Y10T 29/49229* (2015.01)

(58) Field of Classification Search
CPC ...... F04D 29/448; F04D 29/54; F04D 29/542; F04D 29/544; F05D 2240/121; F05D 2240/122; F05D 2240/126
USPC ..... 415/208.2, 208.3, 210.1, 211.1; 416/185, 416/186 R
See application file for complete search history.

(56) References Cited

U.S. PATENT DOCUMENTS

| | | | |
|---|---|---|---|
| 2,991,927 A * | 7/1961 | Quick | F04D 3/00 |
| | | | 415/182.1 |
| 3,369,737 A | 2/1968 | Switzer et al. | |
| 4,006,997 A | 2/1977 | Friberg et al. | |
| 4,086,022 A | 4/1978 | Freeman et al. | |
| 4,131,389 A | 12/1978 | Perrone et al. | |
| 4,212,585 A | 7/1980 | Swarden et al. | |
| 4,218,182 A | 8/1980 | Tsunoda et al. | |
| 4,445,816 A | 5/1984 | Ribaud et al. | |
| 4,606,699 A | 8/1986 | Hemsworth | |
| 4,781,530 A | 11/1988 | Lauterbach et al. | |
| 4,824,325 A * | 4/1989 | Bandukwalla | F04D 29/444 |
| | | | 415/208.4 |
| 4,877,373 A | 10/1989 | Bandukwalla | |
| 4,902,200 A | 2/1990 | Bandukwalla et al. | |
| 5,178,516 A * | 1/1993 | Nakagawa | F04D 29/444 |
| | | | 415/208.3 |
| 5,316,441 A | 5/1994 | Osborne | |
| 5,489,186 A * | 2/1996 | Yapp | F01D 5/141 |
| | | | 415/208.3 |
| 5,595,473 A | 1/1997 | Nagaoka et al. | |
| 5,730,580 A * | 3/1998 | Japikse | F01D 17/16 |
| | | | 415/208.1 |
| 6,290,458 B1 | 9/2001 | Irie et al. | |
| 6,508,626 B1 * | 1/2003 | Sakurai | F04D 29/2277 |
| | | | 416/180 |
| 6,619,909 B2 | 9/2003 | Barnett et al. | |
| 6,877,953 B2 | 4/2005 | Guemmer | |
| 7,338,251 B2 | 3/2008 | Ro et al. | |
| 7,658,592 B1 | 2/2010 | Jarrah et al. | |
| 8,016,557 B2 * | 9/2011 | Abdelwahab | F04D 29/444 |
| | | | 415/208.3 |
| 2003/0152456 A1 | 8/2003 | Guemmer | |
| 2007/0036647 A1 * | 2/2007 | Abdelwahab | F04D 29/444 |
| | | | 415/211.2 |
| 2008/0095614 A1 * | 4/2008 | Aubin | F01D 5/143 |
| | | | 415/144 |
| 2009/0263233 A1 | 10/2009 | Guemmer | |
| 2009/0311095 A1 * | 12/2009 | Blewett | F04D 29/628 |
| | | | 415/209.2 |
| 2011/0097203 A1 * | 4/2011 | Shibata | F04D 17/12 |
| | | | 415/207 |
| 2012/0014788 A1 * | 1/2012 | Blair | F04D 29/444 |
| | | | 415/208.2 |
| 2014/0341706 A1 | 11/2014 | Lardy et al. | |

FOREIGN PATENT DOCUMENTS

| | | |
|---|---|---|
| JP | S52040809 A | 3/1977 |
| JP | 2009299681 A | 12/2009 |

\* cited by examiner

US 10,590,951 B2

STRUCTURES AND METHODS FOR FORCING COUPLING OF FLOW FIELDS OF ADJACENT BLADED ELEMENTS OF TURBOMACHINES, AND TURBOMACHINES INCORPORATING THE SAME

RELATED APPLICATION DATA

This application is a continuation of U.S. Nonprovisional patent application Ser. No. 15/093,266, filed Apr. 7, 2016; which application is a divisional of U.S. Nonprovisional patent application Ser. No. 14/563,204, filed Dec. 8, 2014 (now abandoned); which application is a continuation of Ser. No. 14/162,388, filed on Jan. 23, 2014 (now U.S. Pat. No. 8,926,276, issued Jan. 6, 2014), entitled "Structures and Methods for Forcing Coupling of Flow Fields of Adjacent Bladed Elements of Turbomachines, and Turbomachines Incorporating the Same"; which application claims priority to U.S. Provisional Patent Application Ser. No. 61/755,747, filed on Jan. 23, 2013, and titled "Methods for Forced Coupling of Rotor-Stator Pairs and Turbomachines Incorporating the Same." Each of these applications is incorporated by reference herein in its entirety.

FIELD OF THE INVENTION

The present invention generally relates to the field of turbomachinery. In particular, the present invention is directed to structures and methods for forcing coupling of flow fields of adjacent bladed elements of turbomachines, and turbomachines incorporating the same.

BACKGROUND

Turbomachinery, including compressors, pumps, and turbines, generally include a plurality of rows of bladed elements, often positioned in close proximity to one another, that during use, form passageways for a working fluid. Often, there is relative movement between these adjacent rows, often at very high speeds. Examples include a row of rotating impeller blades coupled to a rotor positioned adjacent to a row of stationary diffuser or nozzle blades or vanes coupled to a stator. Conventional turbomachine design mandates a minimum gap between these adjacent rows of bladed elements to minimize and avoid unwanted interactions between the structures forming these rows, for example, rotor blades and stator vanes. These unwanted interactions include the production of noise and vibration, the latter of which has been known to crack or break rotor blades and/or diffuser vanes.

SUMMARY OF THE DISCLOSURE

In one implementation, the present disclosure is directed to a turbomachine, which includes a first bladed element having a first blade region containing a plurality of first blades and a second bladed element having a second blade region containing at least one second blade, wherein the second blade region is located adjacent to and downstream from the first blade region; wherein the first bladed element has a rotational axis and at least one of the plurality of first blades has a trailing edge located at a radius, $r_2$, from the rotational axis, the turbomachine further including a close coupling flow guide (CCFG) having a leading edge located at a radius, $r_c$, from the rotational axis, and wherein $r_c/r_2$ is less than about 1.

In another implementation, the present disclosure is directed to a turbomachine, which includes a first blade row including a plurality of blades having trailing edges and a close-coupling flow guide (CCFG) located proximate the first blade row, wherein the CCFG overlaps the trailing edges and is configured to guide a portion of working fluid in the turbomachine.

In yet another implementation, the present disclosure is directed to a turbomachine, which includes a hub and shroud forming a diffuser passageway therebetween, the diffuser passageway having an inlet, and the hub having an upstream edge at the diffuser passageway inlet and an impeller rotatably disposed adjacent the shroud, the impeller having a plurality of impeller blades with trailing edges, wherein the trailing edges are located downstream of the upstream edge of the hub and the impeller blades extend into the diffuser passageway.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
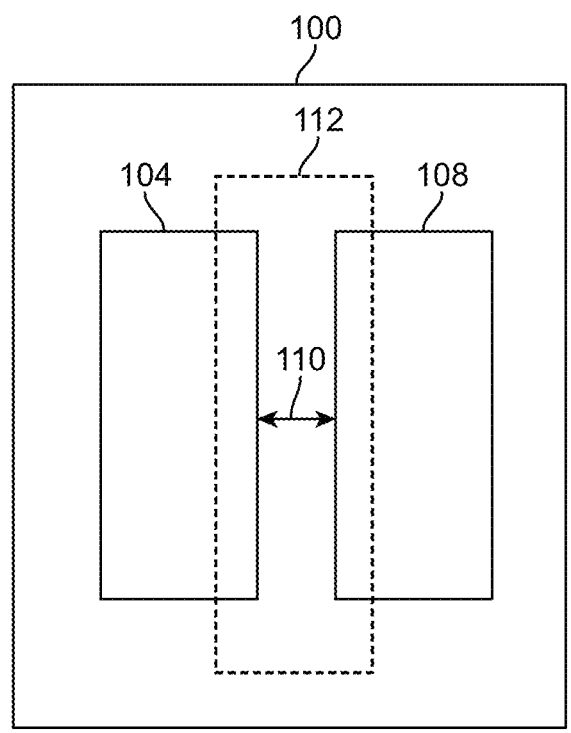
FIG. 1 is a high-level block diagram illustrating a turbomachine made in accordance with the present invention that includes one or more close-coupling flow guides (CCFGs) for enhancing coupling of flow fields between adjacent bladed elements of the turbomachine.

Referring now to the drawings, FIG. 1 illustrates a turbomachine 100 made in accordance with the present invention and that includes a first bladed element 104 and an immediately adjacent second bladed element 108. Turbomachine 100 may be any type of turbomachine suitable for embodying features and aspects of the present invention, including, but not limited to, a compressor, turbine, pump, fan, etc., regardless of the category of the turbomachine, i.e., regardless of whether the turbomachine is a centrifugal machine, axial machine, mixed-flow machine, any other category of machine, or any combination thereof. As will become apparent to those skilled in the art from reading this entire disclosure, each of first and second bladed elements 104 and 108 can be a rotating element (e.g., a centrifugal impeller, centrifugal inducer, axial compressor wheel, axial turbine wheel, fan, pump wheel, etc.) or a stationary element (e.g., a diffuser, nozzle, flow guide, etc.).

As described below in detail, some aspects of the present invention are directed to adding features, referred to herein and in the appended claims as "close-coupling flow guides" (CCFGs), to a CCFG region, here CCFG region 112, that is generally located between adjacent bladed elements, such as bladed elements 104 and 108 of FIG. 1, and/or overlapping with one or both of the adjacent bladed elements, in order to intentionally closely couple the flow fields of these bladed elements. In alternative embodiments CCFG regions may also be located further upstream and/or further downstream such that they do not extend into space 110 extending between bladed elements 104 and 108. As also described below in detail, such CCFGs may include structures that are specifically designed and configured to enhance coupling of the flow fields of the adjacent blade regions without causing unwanted effects, such as unwanted flow, pressure, and/or vibrational disturbances. It is noted that while FIG. 1 illustrates turbomachine 100 as having only a single pair of adjacent bladed elements 104 and 108, in other embodiments the turbomachine at issue may have two or more pairs of adjacent bladed elements, and some or all of the adjacent pairs may be enhanced with CCFGs of the present invention. Before illustrating particular CCFGs, a bit of background is first presented to provide the reader with a detailed understanding of aspects of the present invention.

In conventional turbomachine design, it is widely accepted that a minimum vaneless space must be maintained between adjacent blade regions to avoid unwanted interactions between the blade regions. Examples of such interactions, which can result in pressure field breaking distortions, are included in the study by Japikse, D., 1980, "The Influence of Diffuser Inlet Pressure Fields on the Range and Durability of Centrifugal Compressor Stages," AGARD CP-282. Indeed, the need to control such vibrations has been so great that the turbomachine design world has intensely focused on keeping this separation adequate and invariably thinks about designing each element as a separate entity with no desire to closely couple the two. One consequence of this mindset is a common belief that good stages have little aerodynamic coupling between the rotor and stator, meaning little to no feedback from one element to the other so that neither has a significant influence on the other.

The present inventor, however, has discovered from extensive research and testing that such conventional thinking is incorrect and that with a more sophisticated design approach, structures and features can be added to the traditionally vaneless space, what is referred to herein as the "coupling avoidance zone," to intentionally increase the coupling of the adjacent flow fields. This close coupling can result in increased machine performance, including greater work input from a compressor or pump rotor, greater work output from a turbine rotor, and greater relative diffusion of the flow within the impeller, among numerous other benefits. With the aid of modern computational methods, such as computational fluid dynamics, and finite element analysis, this highly coupled three-dimensional problem can be characterized and close-coupling features can be designed. The close-coupling features described herein, again referred to herein and in the appended claims as CCFGs, provide multiple degrees of freedom for a turbomachinery designer to develop sophisticated structures to intentionally increase the coupling of flow fields, resulting in improved machine performance without creating unwanted interactions between the blade regions and any negative effects of those interactions, such as reduction in performance, vibration, and noise. As will be illustrated in various examples below, CCFGs of the present disclosure may be located partially or entirely within the corresponding coupling avoidance zone and/or located to overlap with the upstream and/or downstream blade regions in order to achieve the desired flow-field coupling.

In conventional turbomachine design, the minimum size of the vaneless space, or coupling avoidance zone as noted above, can vary depending on the type and size of the machine. For radial flow compressors and pumps, the minimum size is generally in the range of about $1.08 \leq r_3/r_2 \leq 1.15$, wherein $r_3$ is the radius from the machine centerline to the leading edge of a vane and $r_2$ is the radius to the impeller or rotor trailing edge. For axial flow machines, the minimum coupling avoidance zone is typically in the range of about ¼C to ½C, wherein C is the chord length of the relevant blade. For mixed flow machines, the applicable metric can be either the radial flow metric ($r_3/r_2$) or the axial flow metric (¼C to ½C), depending on the configuration of the machine. As described more fully below, CCFGs can extend into, or be fully located in, the coupling avoidance zone, such that for radial flow compressors and pumps, $r_c/r_2$ may be less than 1.08, wherein $r_c$ is the radius from the machine centerline to a leading edge of a CCFG, and for axial flow machines, the separation between a leading or trailing edge of a CCFG and an adjacent blade may be less than ¼C.

Figure 2:
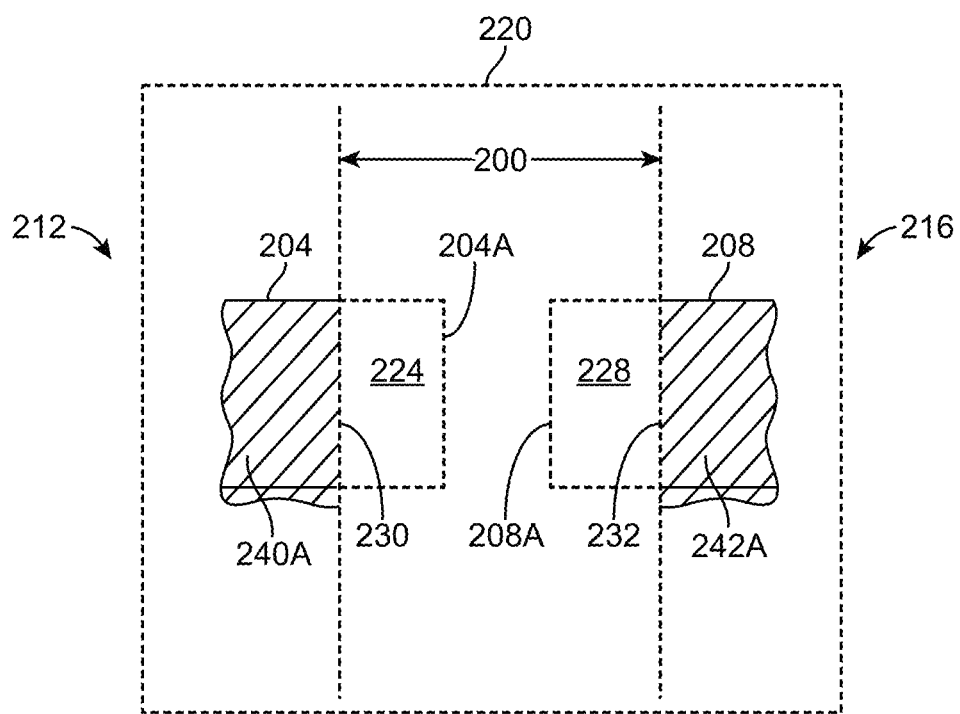
FIG. 2 is a schematic diagram illustrating contextual features of turbomachinery that includes a CCFG.

FIG. 2 of the accompanying drawings introduces in further detail relative to FIG. 1 some of the general features and principles underlying CCFGs described herein and exemplified with particular examples in the remaining figures and accompanying descriptions. FIG. 2 conceptually illustrates the conventional coupling avoidance zone 200 described above, and its relation to the present invention. In FIG. 2, two exemplary blades 204 and 208 of corresponding respective bladed elements 212 and 216 are positioned adjacent to, but spaced from, one another and have corresponding respective leading/trailing edges 204A and 208A, with the leading/trailing nature depending on the direction of flow through the machine. As noted above, each bladed element 212 and 216 can be, for example, a rotor (e.g., a centrifugal impeller, centrifugal inducer, axial compressor wheel, axial turbine wheel, fan, pump wheel, etc.) or a stator (e.g., a diffuser, nozzle, flow guide, etc.), and the bladed elements may be configured for relative movement, such that one bladed element is stationary and the other rotates about a rotational axis of the machine.

In accordance with the present invention, FIG. 2 illustrates a CCFG region 220, which as discussed above contains one or more CCFGs (not shown) intentionally provided to promote flow-field coupling between the adjacent bladed elements 212 and 216. As illustrated, CCFG region 220 may extend upstream and downstream of leading/trailing edges 204A and 208A, may extend into or across coupling avoidance zone 200, may extend to overlap with one, the other, or both of blades 204 and 208, and may also extend in a circumferential direction relative to the rotational axis (not shown) of the turbomachine at issue (here, generally, into and out of the page). It is noted that while the extents of CCFG region 220 are illustrated to extremes, the actual CCFG region used in any particular design need not be so. For example, in some designs, the CCFG region will only occupy a portion of traditional coupling avoidance zone 200. In other designs, the CCFG region will occupy entire coupling avoidance zone 200 and/or overlap with one, the other, or both of adjacent bladed elements 212 and 216. In yet other designs, the CCFG region may be located only upstream and/or downstream of coupling avoidance zone 200 and not be located in the coupling avoidance zone at all. As noted above, an important aspect of CCFGs of the present disclosure is the intentional flow-field-coupling effect that they create, and not necessarily their locations, per se.

As noted above and described in more detail below, CCFG region 220 includes one or more CCFGs of one or more types. In one example, one, the other, or both of leading/trailing edges 204A and 208A, respectively, of blades 204 and 208 may be effectively moved into coupling avoidance zone 200 by the optional addition of suitable CCFG structures 224 and 228 (shown conceptually as dotted lines) to corresponding respective blades 204 and 208. As illustrated, CCFGs 224 and 228 may be added to one or more of blades 204 and 208, effectively moving leading/trailing edges 204A and/or 208A from conventional design leading/trailing edge 230 and 232 to a location in coupling avoidance zone 200. It is noted that depending on the configuration of each of CCFG structures added, the resultant structure might look like a conventional blade in a conventional design, but the difference is that the blades are provided with additional functionality, i.e., the close-coupling functionality, previously avoided by adding CCFG structures.

As shown, each of blades 204 and 208 is located in a corresponding respective blade region 240A and 242A of the corresponding bladed element 212 and 216, wherein, for a rotating element, the blade region is a volumetric space between the swept areas of the conventional design trailing or leading edges of one or more rows of blades on a bladed element, such as conventional design trailing/leading edges 230 and 232, when the element makes a full rotation and, for a stator element, the blade region is the same, except that rotation of the stator element is fictitious rather than actual. In conventional turbomachine design, the coupling avoidance zone extends between the blade regions of the adjacent bladed elements, which are intentionally spaced apart to minimize the amount of flow field coupling. This is depicted in FIG. 2 by coupling avoidance zone 200 extending between blade region 240A of bladed element 212 and blade region 242A of bladed element 216. Embodiments of the present invention include the addition of a CCFG to coupling avoidance zone 200, such that CCFG region 220 may extend beyond any meridional extent of each blade region 240A and 242A (e.g., for a radial flow device, radially outward of the radially outward-most extent of a blade region and/or radially inward of the radially inward-most extent of a blade region).

While FIG. 2 only illustrates CCFGs 224 and 228, as described above CCFGs may be located anywhere within CCFG region 220. Also, while CCFGs 224 and 228 are illustrated conceptually and relatively simply in FIG. 2, as described and illustrated more fully herein, a CCFG of the present disclosure may have any one or more of a variety of differing configurations, including a contoured surface, rib, trough, and channel. For example, CCFGs of the present disclosure may include troughs, channels, and/or ribs in or on a hub or shroud surface, and may extend upstream or downstream of either of blades 204 and 208. CCFGs of the present disclosure may also include ribs, troughs, or channels located on the opposite side of one of blades 204 and 208 from coupling avoidance zone 200. For example, in embodiments where one of blades 204 and 208 is a diffuser vane located downstream of coupling avoidance zone 200, a CCFG may be located downstream of a trailing edge of the diffuser vane.

As will be described more fully below in example embodiments, CCFGs in the form of ribs and contoured surfaces may be added in combination with CCFGs in the form of troughs or channels to optimize the design. For example, in addition to improving flow coupling, troughs and channels may be used to maintain an appropriate cross-sectional area of the pseudo-passage along a cascade by cancelling out any vane blockage due to the addition of a CCFG, such as a contoured surface.

In some embodiments, the CCFGs disclosed herein may be combined with stability and flow control holes, such as those described in International Patent Application No. PCT/US02/19173, titled "FLOW STABILIZING DEVICE," which is incorporated by reference herein for its teachings of stability and flow control holes. Other embodiments may include various noise reduction methods in addition to the design of CCFGs, including the addition of resonators, honeycombs and surface treatments.

In light of the general features of turbomachinery incorporating one or more CCFGs described above and illustrated in the accompanying figures, the following discussion and corresponding figures illustrate some example embodiments to further explain and illustrate aspects of the disclosure.

Figure 3:
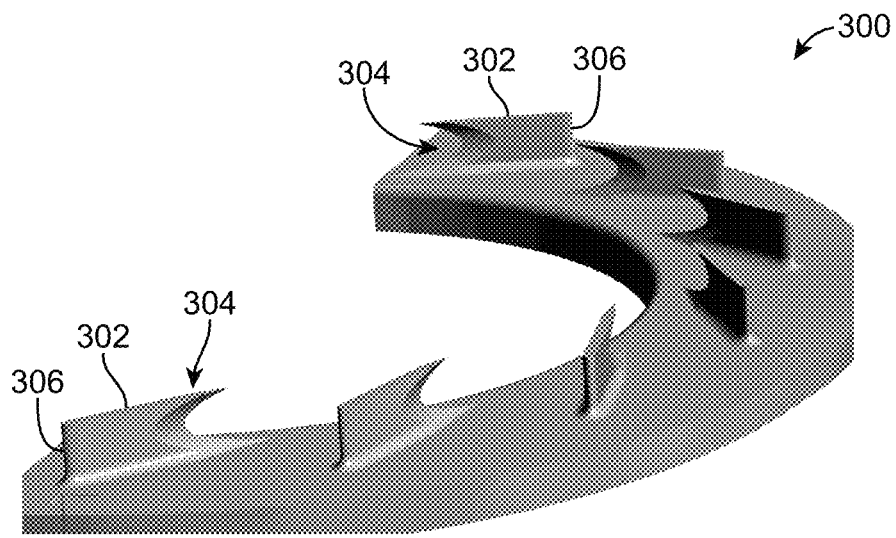
FIG. 3 is an exemplary bladed element in the form of a low-solidity plate diffuser having CCFGs.

In some embodiments, turbomachinery incorporating CCFGs may have bladed elements having a low solidity row of airfoils or plates, such as where the bladed element is a diffuser, where solidity is defined as the ratio of chord length to pitch, and where a low solidity row may have a solidity ratio in the range of approximately 0.5 to 1.3. For example, low solidity may refer to minimal overlap or no overlap between any two adjacent vanes. FIG. 3 illustrates a portion of an exemplary low-solidity diffuser 300 having a plurality of blades 302 in the form of plates. For ease of comparison, diffuser 300 is an example of one of bladed elements 104 or 108 (FIG. 1), and blades 302 are examples of blades 204 or 208 (FIG. 2). In the illustrated embodiment, a leading edge of each of blades 302 includes a CCFG, in the form of contoured surface 304 that is designed and configured to closely couple a flow field in an adjacent bladed element, such as an impeller, with a flow field in diffuser 300. As will be described more fully below, contoured surfaces 304 can provide multiple degrees of freedom for designing a CCFG for optimal coupling for a given application, and the contoured surfaces may also act as additional structural support for blades 302, which can improve vibrational performance. Blades 302 may be configured such that contoured surfaces 304 extend into a coupling avoidance zone to more closely couple adjacent flow fields. In alternative embodiments, low-solidity diffuser 300 may also include additional CCFGs in the form of any of the CCFGs described herein. For example, CCFGs may also be located downstream of trailing edge 306 of one or more of blades 302, or may be located between adjacent blades. CCFGs may also be added to low solidity rows comprising vanes with airfoil cross-sectional shapes, and may also be added to blade rows having higher solidity. In addition, as described more fully below, blades 302 may include fillets along all or a portion of the base of the vanes to improve vane strength and vibrational performance.

Figure 4:
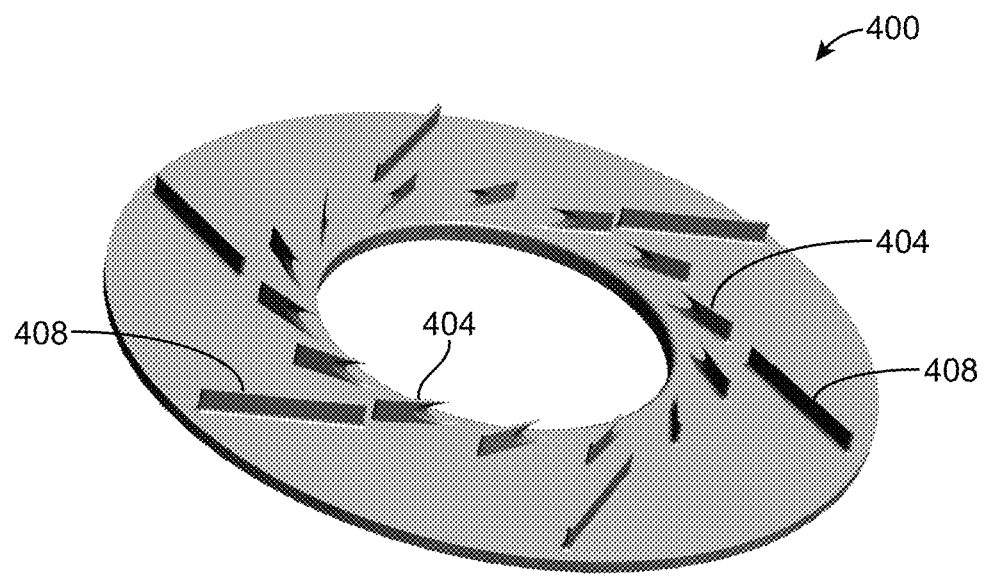
FIG. 4 is an exemplary bladed element in the form of a low-solidity plate diffuser having CCFGs and a tandem row of downstream blades.
Figure 5:
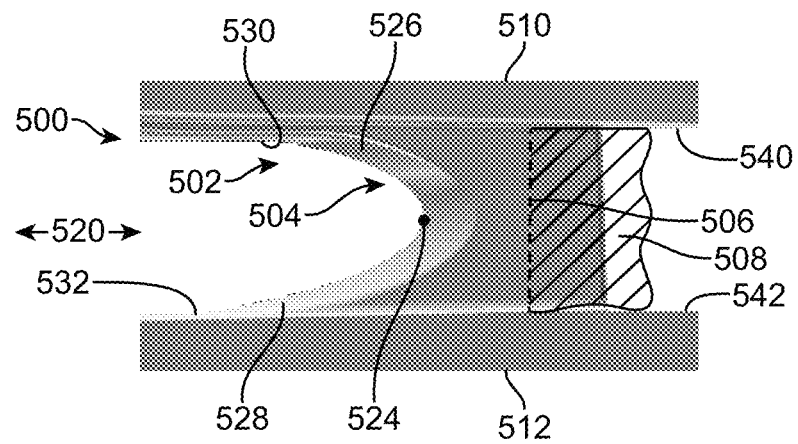
FIG. 5 is a side view of a blade having an exemplary CCFG in the form of a contoured surface.

FIG. 4 illustrates low-solidity diffuser 400 that includes a first low solidity row of blades 404 in the form of plates, and also includes a second downstream row of tandem blades 408. In conventional turbomachinery design, the number of downstream tandem blades is typically the same or greater than the number of upstream blades because a primary purpose of tandem blades in conventional design is to limit the level of loading coefficient per row. In the illustrated embodiment, however, the number of downstream tandem blades 408 may vary, from more than the number of first row blades 404 to less than the number of the first row blades, including just one tandem blade 408, and the tandem blades may be full or partial height blades. In the illustrated embodiment, low-solidity diffuser 400 has 14 first row blades 404 and 6 second row tandem blades 408, which is less than half the number of the first row blades. The illustrated embodiment does not require more tandem blades 408 than first row blades 404 because, in the illustrated embodiment, the tandem blades are designed and configured to improve stability by acting as a break for rotating stall cells, or serving as a boundary layer guide or fence to prevent flow overturning and separation or stall.

FIGS. 5-10 illustrate various aspects of an exemplary blade 500 having a CCFG in the form of contoured surface 502 formed on a leading/trailing edge 504 of the blade. In the illustrated embodiment, contoured surface 502 extends from conventional leading/trailing edge 506, which corresponds to conventional leading trailing edge 230 or 232 (FIG. 2). Thus, the addition of contoured surface 502 to blade 500 causes leading/trailing edge 504 to extend beyond blade region 508, (which would correspond to blade region 240A or 242A (FIG. 2)) and into a coupling avoidance zone (not shown). Contoured surface 502 may, therefore, extend into a coupling avoidance zone of a machine and improve flow field coupling and increase machine performance. Contoured surface 502 may be located in certain locations of a CCFG region, which would correspond to CCFG region 220 (FIG. 2). Blade 500 may be located in any number of types of machines and may be coupled to any one of a number of bladed elements in the machines. For example, blade 500 may be a vane of a diffuser in a compressor or pump, or may be a vane of a nozzle in a turbine. In the illustrated embodiment, blade 500 extends between hub 510 and shroud 512 of a bladed element (such as bladed elements 104 or 108 (FIG. 1) and is positioned in a flow passageway 520. Example contoured surface 502 is formed in leading/trailing edge 504 and has a curved or parabolic shape with an apex 524 and includes upper leg 526 and lower leg 528, each having ends 530 and 532. Contoured surface 502 provides additional structure to blade 500 which may improve vibrational performance. In addition, blade 500 may also have a fillet radii 600 (best seen in FIG. 6) at one or more of the base or top of the blade, and may also have an appropriate thickness distribution to increase vibrational performance.

In the example embodiment, contoured surface 502 is substantially symmetrical, with apex 524 being located substantially at the midpoint between hub surface 540 and shroud surface 542, and ends 530 and 532 of upper and lower legs 526 and 528 being located at substantially the same distance from apex 524. In alternative embodiments, CCFGs may include a variety of alternative contoured surface shapes, including asymmetrical shapes. For example, the location of the apex may vary, both in the relative distance between hub surface 540 and shroud surface 542, and also the distance from ends 530 and 532. For example, example contoured surfaces include apexes located in a coupling avoidance zone, as well as contoured surfaces were the apex is located outside of the coupling avoidance zone and one or both of the legs of the contoured surface extend into the coupling avoidance zone. Alternative contoured surfaces include other geometric shapes, including triangular, and shapes without an apex. As described and illustrated in example embodiments below, the legs may vary in length, with, for example, an upper leg being longer than a lower leg, and having a non-planar contoured surface, such as a twisted contoured surface.

Figure 6:
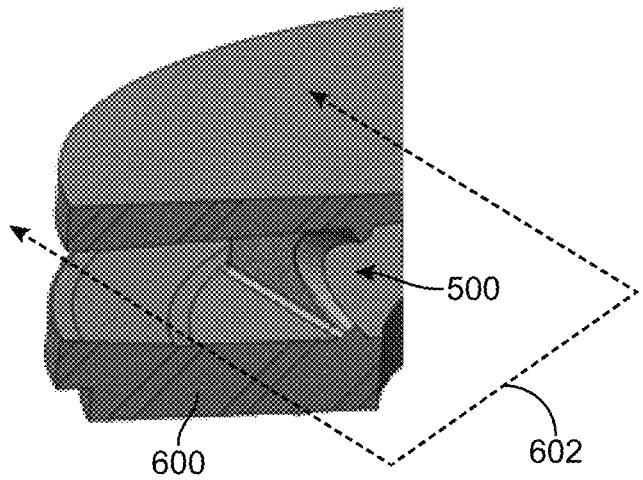
FIG. 6 is a perspective view of the blade shown in FIG. 5.
Figure 7:
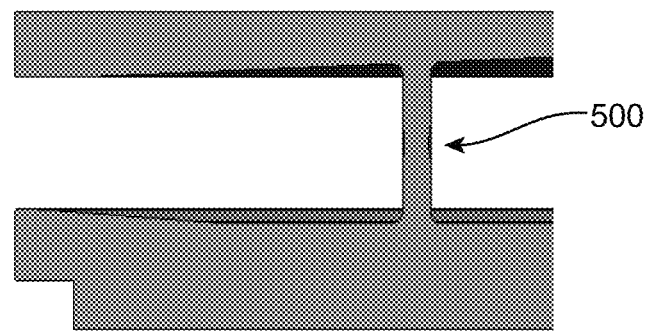
FIG. 7 is a front, cross-sectional view of the blade shown in FIGS. 5-6.
Figure 8:
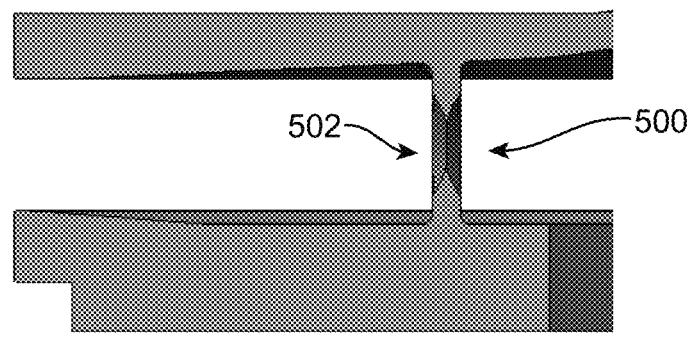
FIG. 8 is a front, cross-sectional view of the blade shown in FIGS. 5-7.
Figure 9:
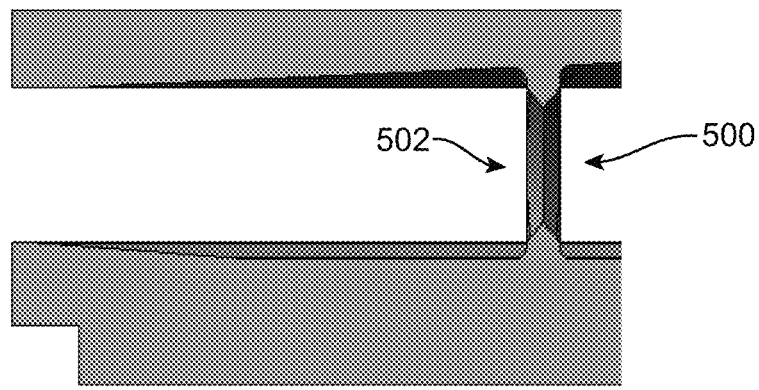
FIG. 9 is a front, cross-sectional view of the blade shown in FIGS. 5-8.
Figure 10:
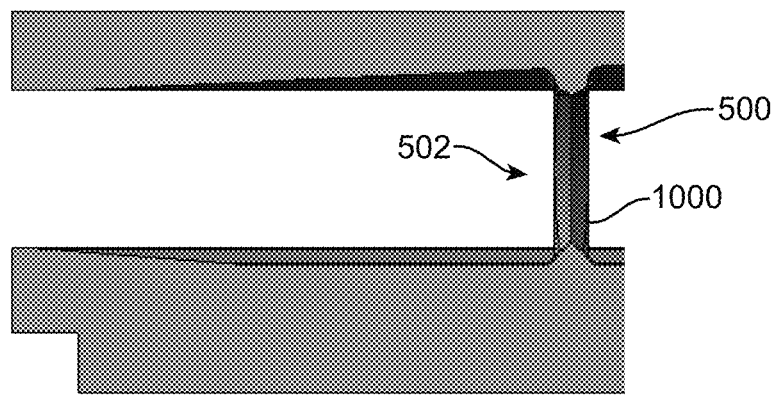
FIG. 10 is a front, cross-sectional view of the blade shown in FIGS. 5-9.

FIGS. 6-10 illustrate various cross sections of contoured surface 502 when viewed from the perspective shown by arrow 602 in FIG. 6. More specifically, FIG. 7 illustrates a cross section of blade 500 at the beginning of contoured surface 502 (when viewing FIG. 5, at a location to the right of the point identified by reference numeral 524). FIGS. 8-10 illustrate cross sections at locations further along blade 500 and contoured surface 502. As shown, leading/trailing edge 504 of contoured surface 502 (when viewing FIG. 5, starting at the location to the right of the point identified by reference numeral 524 and moving to the left along the contoured surface) narrows to a midpoint 1000 (FIG. 10) in the thickness of blade 500, forming a sharpened aerodynamic shape that may improve flow performance. This chevron or leading edge thinning or tapering may be located on either vane side, or both, or vary differentially from one side to that other.

Figure 11:
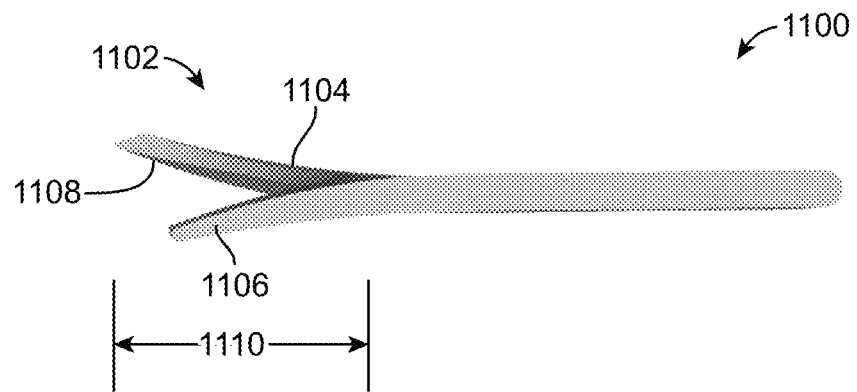
FIG. 11 is top view of a blade having an alternative CCFG in the form of a twisted contoured surface.
Figure 12:
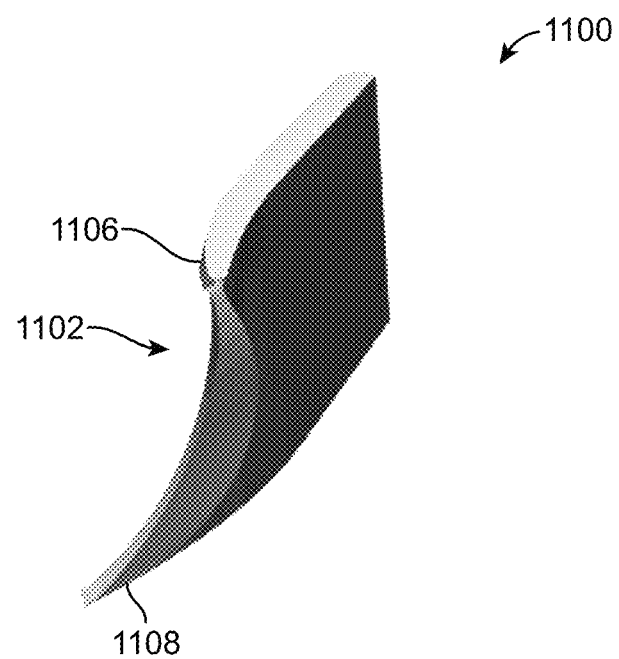
FIG. 12 is a side view of the blade shown in FIG. 11.
Figure 13:
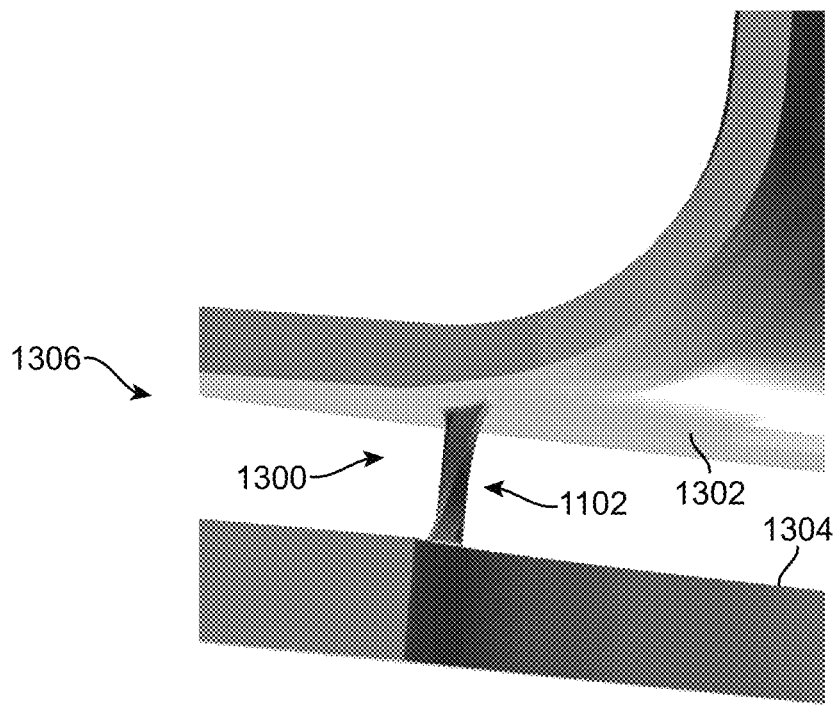
FIG. 13 is a perspective view of an example bladed element having a blade with the twisted contoured surface shown in FIGS. 11-12.

FIGS. 11-13 illustrate an alternative blade 1100 having CCFG in the form of a twisted contoured surface 1102. As with contoured surface 502, twisted contoured surface 1102 is formed in a leading or trailing edge 1104 of blade 1100 that may be located in a variety of different machines. Unlike contoured surface 502, twisted contoured surface 1102 has a twisted shape, such that upper leg 1106 curves away from blade 1100 in one direction, and lower leg 1108 curves away from the blade in substantially the opposite direction. In the illustrated embodiment, only a leading/trailing portion 1110 of blade 1100 is twisted, and the remainder of blade 1100 is substantially planar. In alternative embodiments, a larger portion of blade 1100, including the entire length of blade 1100 may have a twisted configuration. FIG. 13 illustrates an example application of twisted contoured surface 1102, located on a leading edge of blade 1300 positioned between a shroud surface 1302 and hub surface 1304 of bladed element 1306, such as one of bladed elements 104 and 108 (FIG. 1).

Thus, as illustrated in FIGS. 5-13 and described in the accompanying description, CCFGs in the form of contoured surfaces provide a turbomachinery designer with a large number of degrees of freedom for optimizing geometry for a given application, including the shape of the contoured surface, the relative lengths of the legs, and twisting of the contoured surface, as well as the blade the contoured surface is formed in.

Figure 14:
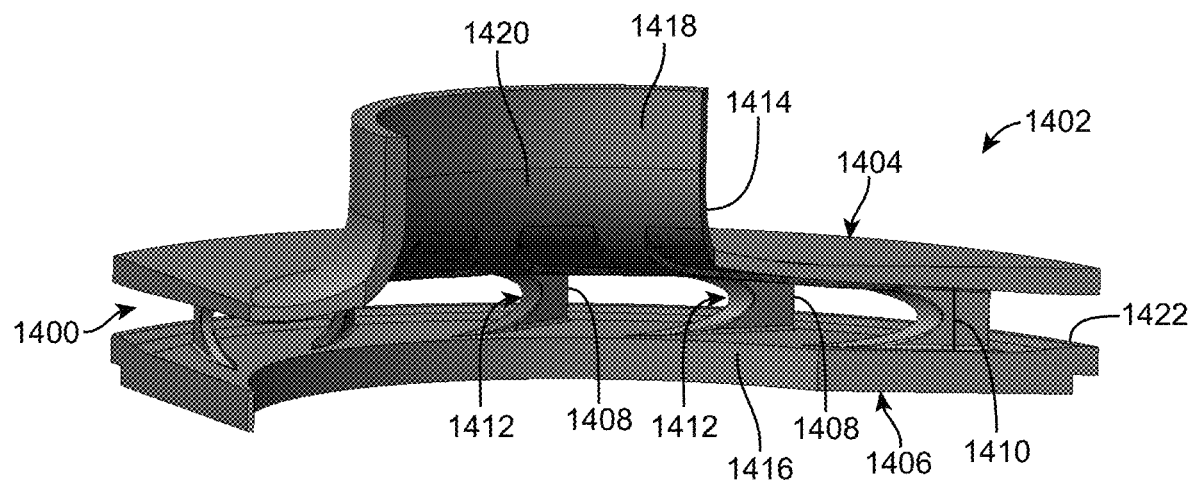
FIG. 14 is a perspective view of an example bladed element in the form of a diffuser having a plurality of blades and a plurality of CCFGs.
Figure 15:
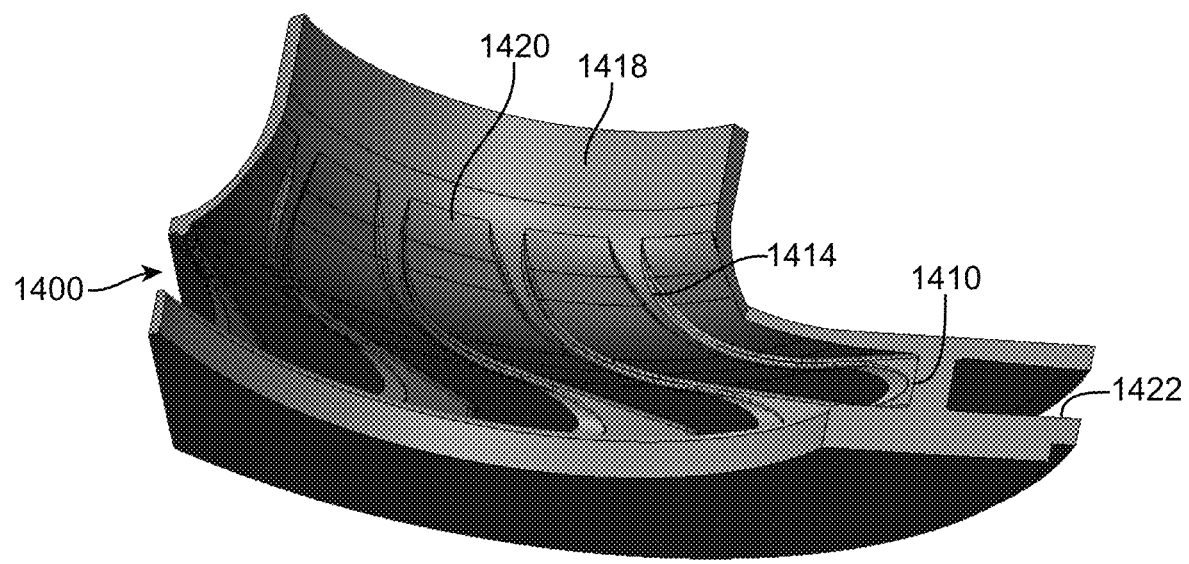
FIG. 15 is another perspective view of the bladed element shown in FIG. 14.
Figure 16:
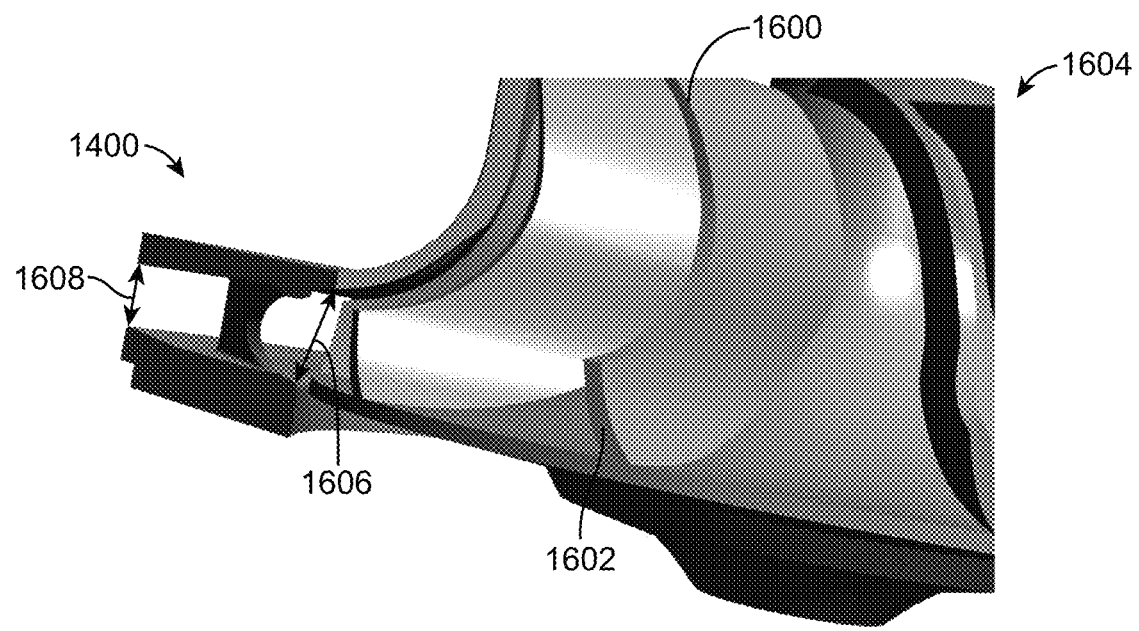
FIG. 16 is a perspective view of the bladed element shown in FIGS. 14-15 combined with another bladed element in the form of an impeller.

FIGS. 14-16 illustrate an exemplary embodiment of a bladed element in the form of diffuser 1400 of a radial flow compressor/pump 1402 utilizing various forms of CCFGs. For ease of comparison, radial flow compressor/pump 1402 is an example turbomachine 100 (FIG. 1) and diffuser 1400 is an example bladed element 104 or 108 (FIG. 1). Compressor/pump 1402 includes shroud 1404 and hub 1406, and a plurality of blades 1408 extending therebetween, forming diffuser 1400. In the example embodiment, blades 1408 form a low solidity row, and are positioned in a blade region extending from a conventional design leading edge 1410 of the blades radially outward. Blades 1408 have CCFGs in the form of contoured surfaces 1412 that have a similar configuration as contoured surface 502 (FIG. 3). As best seen in FIG. 15, unlike contoured surface 502, upper legs 1414 of contoured surface 1412 extend radially inward to a greater extent than lower legs 1416, and extend along shroud surface 1418, overlapping impeller blades 1600 (FIG. 16). Thus, upper legs 1414 form ribs in shroud surface 1418, and also form troughs 1420 extending between the ribs. Thus, unlike conventional turbomachine design, a leading edge of blades 1408 include a CCFG in the form of contoured surface 1412 that not only extends into the traditional coupling avoidance zone, but a portion of the contoured surface 1412 actually overlaps a trailing edge 1602 of impeller blades 1600 (FIG. 16). The illustrated configuration therefore results in a $r_c/r_2$ ratio of less than 1.0, whereas conventional design would forbid ratios less than about 1.08. Such a configuration allows diffuser 1400 to begin to direct flow while the flow is still in impeller 1604 (FIG. 16), using troughs 1420 and upper legs 1414, and continues to efficiently guide the flow into pseudo-passageways of diffuser 1400, creating close-coupling between rotor and stator flow fields.

In alternative embodiments, separate ribs or channels located between diffuser blades, rather than extending from a leading edge of the blades, may be utilized instead of, or in combination with the CCFGs illustrated in FIGS. 14-16. The size and shape of the ribs and channels may also vary. For example, while troughs 1420 in the illustrated embodiment have a width defined by upper legs 1414 extending from blades 1408, narrower channels may be used, in addition to, or as an alternative to troughs 1420. In addition, troughs or channels may be used downstream of blades 1408 to further enhance flow guidance and coupling. Additional structures such as a turbulator or raised rib or riblet may also be added to one or more of the hub and shroud surfaces 1422 and 1418 to generate turbulence and thereby stabilize flow by enhancing local mixing.

The various degrees of freedom of the CCFGs can be utilized by a designer to ensure the CCFGs do not result in adverse vibrational performance. For example, the size of troughs 1420 may be configured to counteract the increased space taken up by upper legs 1414 and contoured surfaces 1412. Also, as best seen in FIGS. 14 and 16, hub and shroud surfaces 1422 and 1418 may be tapered, with a greater height 1606 at the entrance of diffuser 1400, and a smaller height 1608 at the diffuser exit. Lowering hub surface 1422 at the diffuser entrance may, in some designs, improve flow coupling. Also, increasing height 1606 at the diffuser entrance can be utilized, along with troughs 1420 to balance the additional CCFG structure added to the flow passage and minimize vane blockage. Also, as described above, the shape of contoured surface 1412 can be optimized for a specific application.

Figure 17:
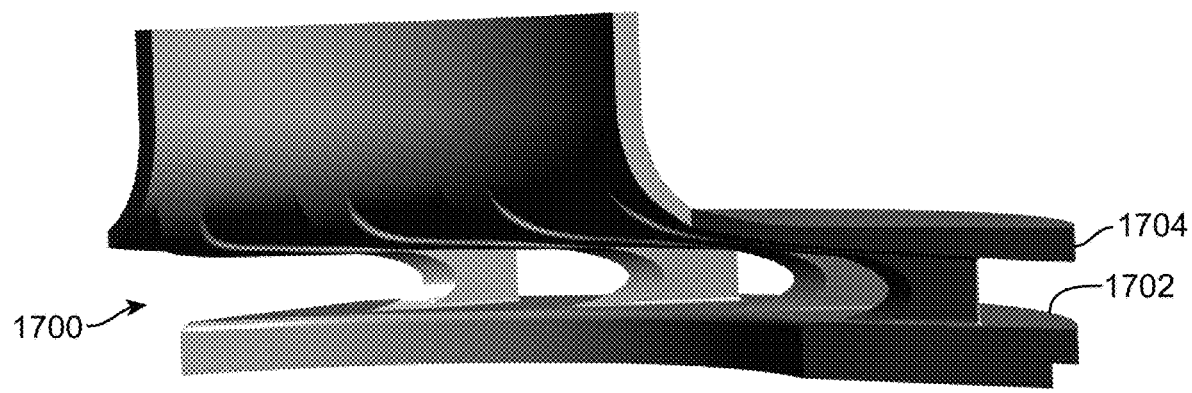
FIG. 17 is a perspective view of an example bladed element that does not have a tapered hub surface.

FIG. 17 illustrates an alternative compressor/pump diffuser 1700 that is similar to diffuser 1400, except that hub surface 1702 is not tapered, while shroud surface 1704 is tapered, similar to shroud surface 1418 (FIGS. 14-15). In alternative embodiments, hub surface 1702 may be tapered instead of shroud surface 1704. Thus, the angle of the shroud and hub surfaces 1702 and 1704 may be varied to tailor the size and contour of the flow passageway in combination with the additional CCFGs to optimize flow.

Figure 18:
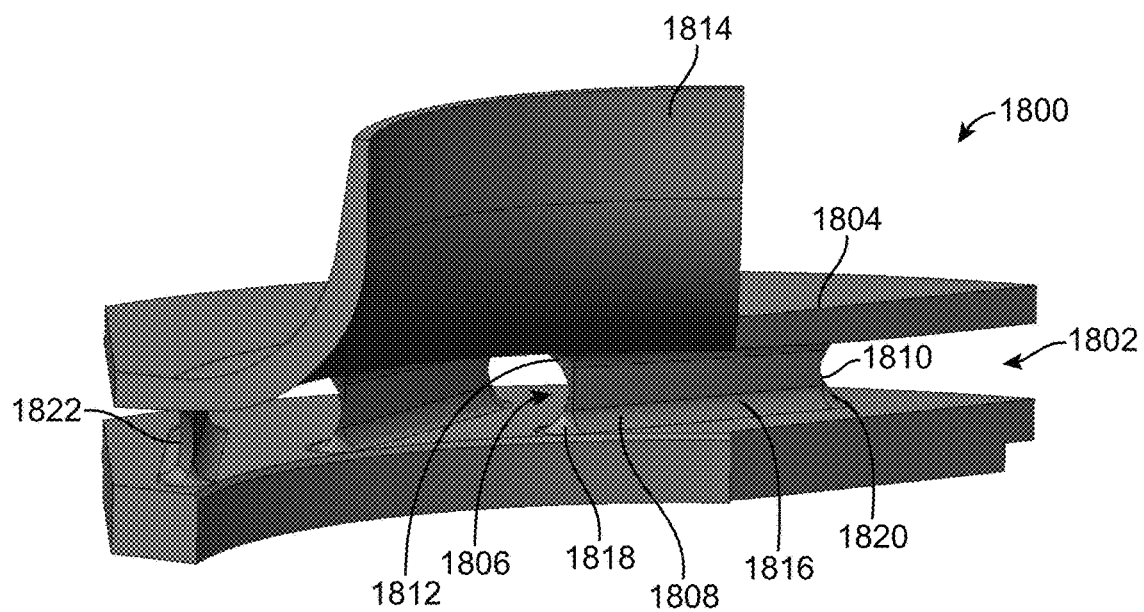
FIG. 18 is a perspective view of an example bladed element having blades with CCFGs that include a chamfered surface on a pressure side of the blades.
Figure 19:
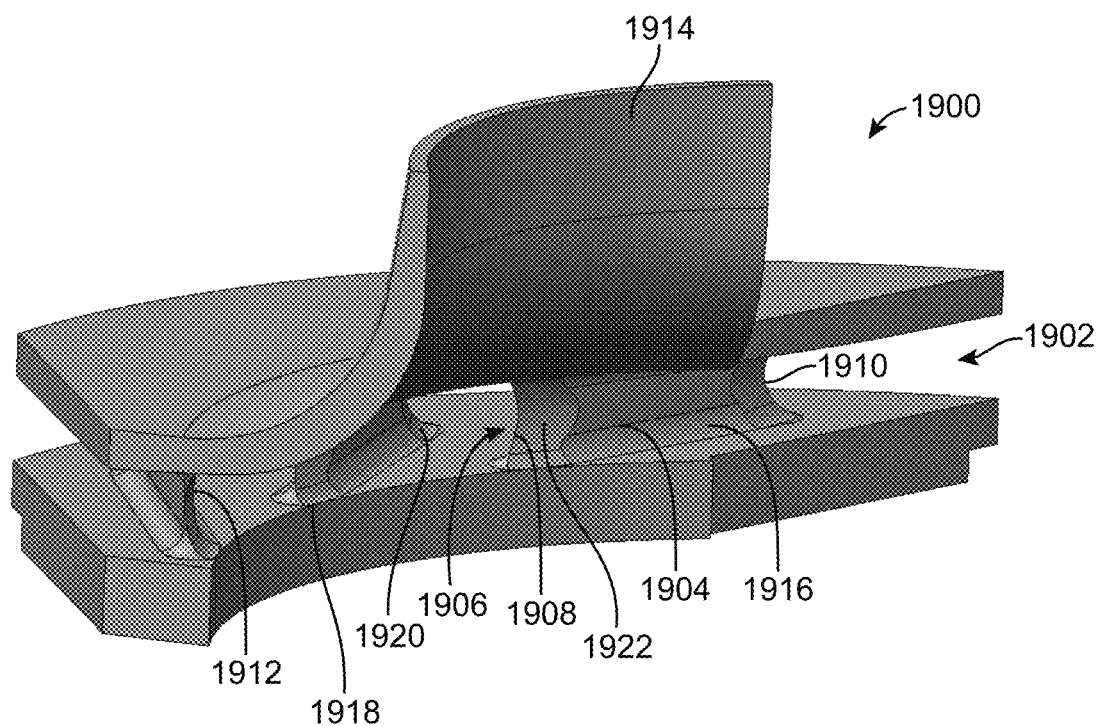
FIG. 19 is a perspective view of an example bladed element having blades with CCFGs that include a chamfered surface on a suction side of the blades.

FIGS. 18 and 19 illustrate alternative CCFG configurations. Compressor/pumps 1800 and 1900 include low solidity diffusers 1802 and 1902 having a plurality of blades 1804 and 1904. Unlike compressor/pump 1402, blades 1804 and 1904 have an alternative contoured surface 1806 and 1906, each having a more shallow curvature than contoured surface 1412. Also, unlike compressor/pump 1402, blades 1804 and 1904 have contoured surfaces on both leading edges 1808, 1908 and trailing edges 1810, 1910. Also, upper legs 1812, 1912 are shorter than upper legs 1414 and do not extend up shroud surface 1814, 1914. In alternative embodiments, contoured surfaces 1806 or 1906 may be combined with any of the other CCFGs disclosed herein, including troughs, channels, extended upper legs forming ribs, as well as ribs in other locations. Blades 1804 and 1904 also include fillet radii 1816 and 1916 extending along the perimeter of the top and bottom of blades. Fillet radii 1816 and 1916 provide increased structural integrity to blades 1804 and 1904 and provide a small gusset 1818, 1918 and 1820, 1920 at leading and trailing edges 1808, 1908 and 1810, 1910 of the blades.

Contoured surfaces 1806 and 1906 also include alternative leading edge designs, which may be utilized for differential incidence control. More specifically, as described above and best illustrated in FIGS. 8-10, contoured surface 502 includes a sharpened leading edge that converges at a midpoint 1000 of blade 500. By contrast, leading edge 1808 of contoured surface 1806 includes a chamfered surface 1822 on a pressure side of blades 1804, and leading edge 1908 of contoured surface 1906 includes a chamfered surface 1922 on a suction side of blades 1904. Thus, the leading edge of the CCFG contoured surfaces disclosed herein can be varied, including by the selective location of a chamfered surface to incorporate differential incidence control in the blade design.

Figure 20:
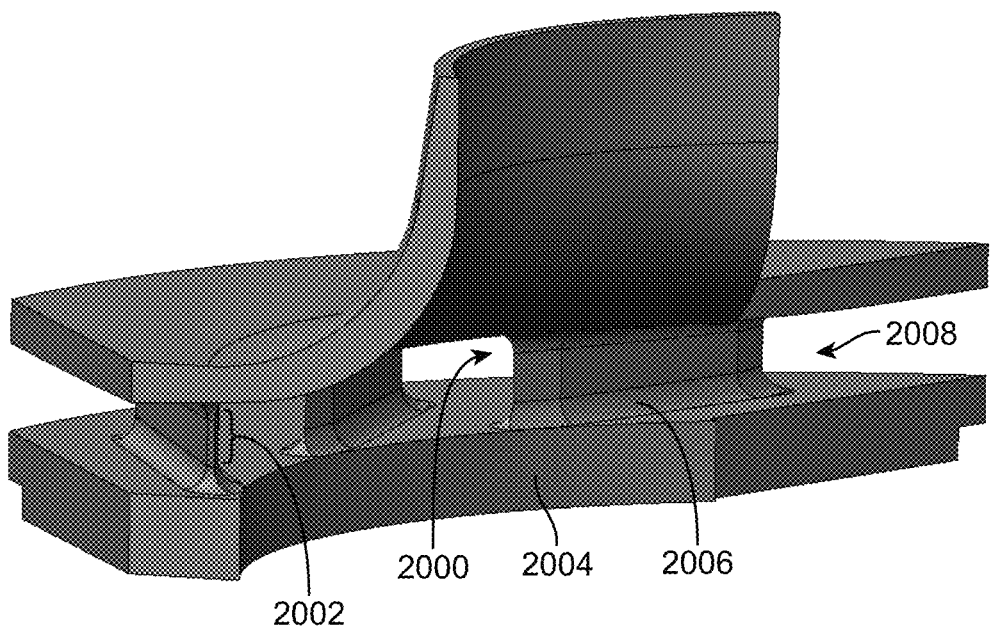
FIG. 20 is a perspective view of an example bladed element having blades with CCFGs that include leading and trailing edges each having a straight mid portion bounded on top and bottom by fillets.
Figure 21:
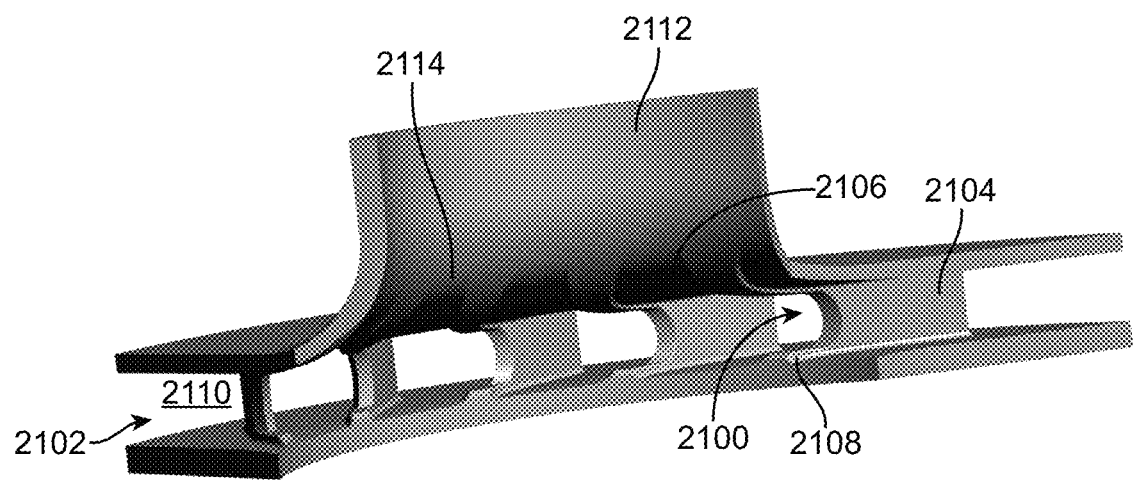
FIG. 21 is a perspective view of an example bladed element having blades with CCFGs that include an alternative contoured surface.

FIGS. 20 and 21 illustrate additional alternative contoured surfaces 2000 and 2100. As shown in FIG. 20, contoured surface 2000 is formed from a substantially straight mid portion 2002 bounded on top and bottom by fillets 2004 and 2006 that provides a tapered upper and lower portion to a leading edge of blade 2008. As with blades 1804 and 1904, blade 2008 has a contoured surface 2000 on both leading and trailing edges. FIG. 21 illustrates a diffuser 2102 including blades 2104 in the form of flat plates, and having a contoured surface 2100. Contoured surface 2100 has a rounded shape, and includes upper leg 2106 and lower leg 2108. Both upper and lower legs 2106 and 2108 have a curvature and curve away from a suction side 2110 of blades 2104. Upper leg 2106 has a longer length than lower leg 2108, and extends along shroud surface 2112, forming troughs 2114.

Figure 22:
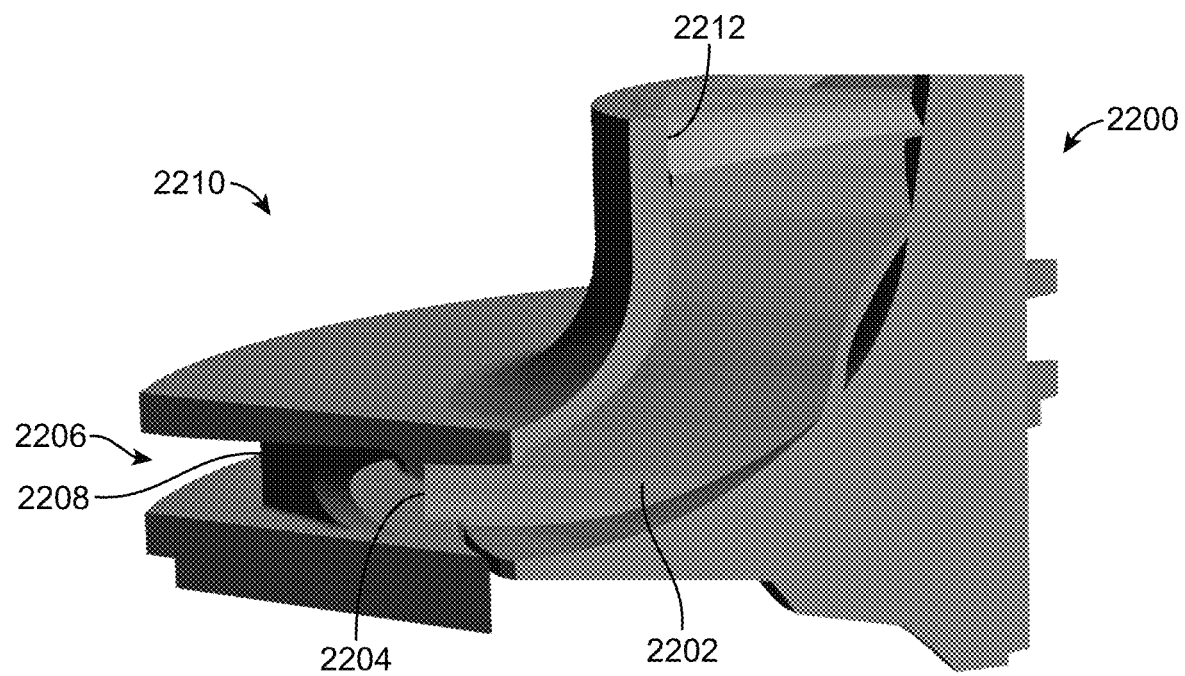
FIG. 22 is a perspective view of an example radial compressor/pump having impeller blades with CCFGs that extend into a diffuser passageway.
Figure 23:
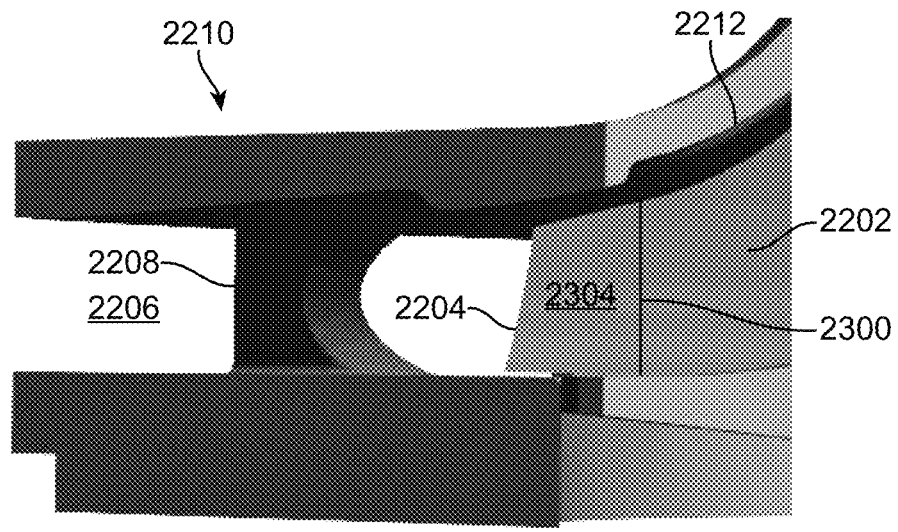
FIG. 23 is a close-up view of the impeller blade CCFG shown in FIG. 22.

FIG. 22 illustrates an alternative compressor/pump 2200 having an extended impeller 2202. As best seen in FIG. 22, trailing edge 2204 of impeller blade 2202 that extends beyond a conventional design trailing edge 2300 (FIG. 23) (which, for convenience corresponds to conventional design trailing/leading edges 230 and 232 (FIG. 1)) and extends into diffuser passageway 2206. Extended portion 2304 (FIG. 23) of impeller blade 2202 is therefore a CCFG that is designed and configured to closely couple the adjacent flow fields. Thus, the design of compressor/pump 2200 is in direct contradiction of conventional design practices, which mandates a minimum gap between diffuser vanes and impeller blades. Instead, portions of blade 2208 of diffuser 2210 may extend along shroud surface 2212, overlapping impeller blade 2202 and begin to guide flow while the flow is still in the impeller, and a trailing edge 2204 of impeller blade 2202 may overlap diffuser passageway 2206, extending into the diffuser passageway, and efficiently guiding and closely coupling the two flow fields. Compressor/pump 2200 may also include diagonal tapering or trim of impeller trailing edge 2204 to optimize the rotor-stator geometry.

Figure 24:
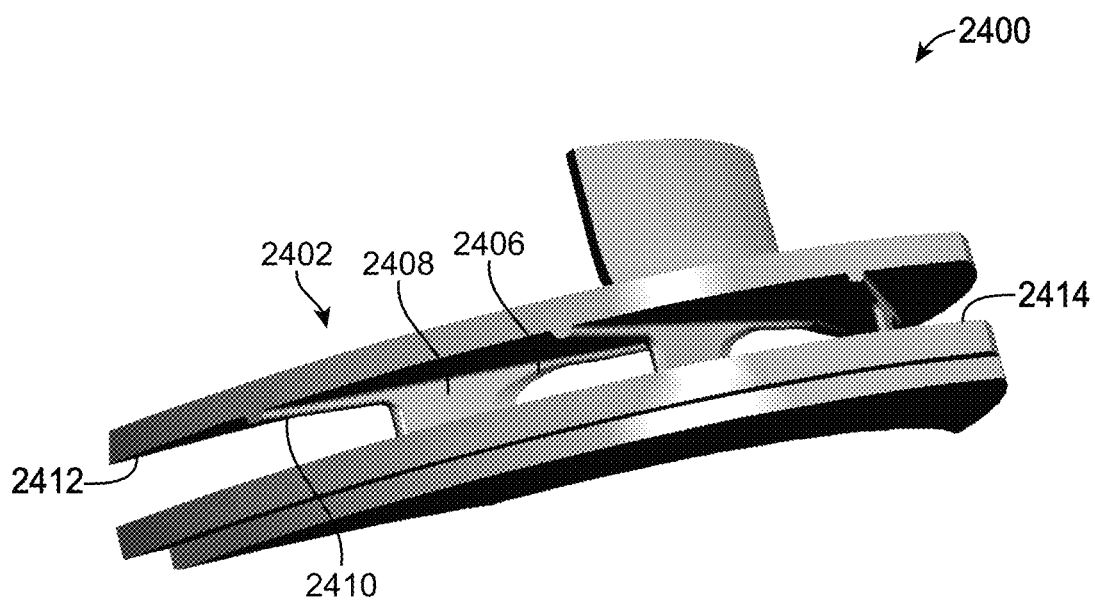
FIG. 24 is a perspective view of an example bladed element having blades with CCFGs that include ribs extending from a trailing edge of the blades along a shroud surface.

FIG. 24 illustrates an alternative compressor/pump 2400 having a low solidity diffuser 2402 that is similar to other diffusers disclosed herein, having various CCFGs, including a contoured surface 2406 on a leading edge of blades 2408. Blades 2408 have an additional CCFG in the form of ribs 2410 extending from a trailing edge of the blades, along shroud surface 2412. Ribs 2410 may act as an additional flow guide downstream of blades 2408, and may also improve stability by acting as a break for rotating stall cells, serving as boundary layer guide or fence, and preventing flow overturning and separation or stall. Ribs 2410 may also be combined with troughs to form continuous troughs that extend from the shroud surface in the impeller, through the diffuser to a vaneless space downstream of the diffuser to increase close coupling. In alternative embodiments ribs 2410 may be placed along hub surface 2414 in addition to, or instead of, shroud surface 2412, and the shape and size of the ribs may vary, including having a larger height that extends further from shroud surface 2412, and alternative shapes, including airfoil, skewed, or curved.

Further alternative exemplary embodiments of the present invention are described in the paragraphs below.

In one example, a turbomachine, including a first bladed element having a first blade region containing a plurality of first blades; a second bladed element having a second blade region containing at least one second blade, the second blade region located adjacent to the first blade region; and a close-coupling flow guide (CCFG) designed and configured to, during use, closely couple a flow field of the first bladed element with a flow field of the second bladed element. Such an exemplary turbomachine may also include one or more of the following features:

Ones of the plurality of second blades in the low solidity blade row includes a plurality of airfoils.

The CCFG includes a fin structure.

The contoured surface having a leading or trailing edge having a midpoint, the leading or trailing edge includes a tapering approximately to the midpoint.

The contoured surface having a leading edge including a chamfer.

The chamfer located on a pressure side of the contoured surface.

The chamfer located on a suction side of the contoured surface.

The second blade having a leading edge located adjacent to the first blade region and a trailing edge located on an opposing side of the second blade from the leading edge, and wherein the rib extends from the trailing edge of the second blade.

The CCFG includes a channel.

The channel overlaps the first blade region.

The channel overlaps the second blade region.

The CCFG coupled to a leading edge or trailing edge of at least one of: 1) one of the plurality of first blades and 2) the at least one second blade.

The CCFG overlaps at least one of: 1) one of the plurality of first blades and 2) the at least one second blade.

The CCFG includes a recess.

The recess overlaps the first blade region.

The recess overlaps the second blade region.

Includes a hub surface, wherein the recess is a tapered recess in the hub surface.

The first bladed element includes a rotor and the second bladed element includes a stator.

The second bladed element is part of a nozzle.

The second bladed element is part of a diffuser.

Includes a rotor cover, and wherein the CCFG is formed in the rotor cover.

The CCFG includes a recess.

The rotor cover has a surface facing at least one of the first blade and the second blade, and the CCFG extends from the surface.

The turbomachine is a radial flow machine, the rotor has a rotational axis, the first blade has a trailing edge located at a radius, $r_2$, from the rotational axis, the CCFG has a leading edge located at a radius, $r_c$, from the rotational axis, and wherein $r_c/r_2$ is greater than zero and less than about 1.08.

The turbomachine is an axial flow machine, the first blade has a chord length, C, and a trailing edge, the CCFG has a leading edge, and wherein a distance between the leading edge and the trailing edge is less than about ¼ times C.

In a second alternative exemplary embodiment, a turbomachine includes a first blade row positioned adjacent to a second blade row; and a one close-coupling flow guide (CCFG) located proximate to at least one of the first blade row and the second blade row, the CCFG being designed and configured to closely couple a flow field of the first blade row with a flow field of the second blade row. Such an exemplary turbomachine may also include one or more of the following features:

The CCFG overlaps at least one of the first blade row and the second blade row.

The feature is a tapered recess in at least one of the hub surface and the shroud surface.

Includes a tandem blade row positioned downstream of the second blade row, the tandem blade row having a lower blade number than the second blade row.

In a third alternative exemplary embodiment, a method of designing a turbomachine, includes defining adjacent rows of blades; adding a close-coupling flow guide (CCFG) to a coupling avoidance zone extending between the adjacent rows of blades; and designing and configuring the CCFG to create feedback between flow fields in the adjacent rows of blades to thereby closely couple the adjacent rows of blades.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A turbomachine, comprising:
a first bladed element having a first blade region containing a plurality of first blades; and
a second bladed element having a second blade region containing at least one second blade, wherein the second blade region is located adjacent to and downstream from the first blade region;
wherein the first bladed element has a rotational axis and at least one of the plurality of first blades has a trailing edge located at a radius, $r_2$, from the rotational axis, the turbomachine further including a close coupling flow guide (CCFG) having a leading edge located at a radius, $r_c$, from the rotational axis, and wherein $r_c/r_2$ is less than about 1.

2. A turbomachine according to claim 1, further comprising a coupling avoidance zone extending between the first blade region and the second blade region, and wherein the CCFG is located in the coupling avoidance zone.

3. A turbomachine according to claim 1, wherein the second bladed element comprises a plurality of second blades arranged and configured into a low solidity blade row.

4. A turbomachine according to claim 3, wherein the second bladed element further comprises a plurality of third blades arranged and configured into a tandem blade row positioned downstream of the low solidity blade row, the tandem blade row having a lower blade count than the low solidity blade row.

5. A turbomachine according to claim 3, wherein the low solidity blade row comprises a plurality of flat plates.

6. A turbomachine according to claim 1, wherein the CCFG comprises a contoured surface.

7. A turbomachine according to claim 6, wherein the contoured surface has a leg overlapping the first blade region.

8. A turbomachine according to claim 7, wherein a portion of the contoured surface is located in the second blade region.

9. A turbomachine according to claim 1, wherein the CCFG comprises a rib.

10. A turbomachine according to claim 9, wherein a first portion of the rib is located in the first blade region and a second portion of the rib is located in the second blade region.

11. A turbomachine according to claim 9, wherein the CCFG further comprises a second rib and a trough, the trough located between the rib and the second rib.

12. A turbomachine, comprising:
a first blade row including a plurality of blades having trailing edges; and
a close-coupling flow guide (CCFG) located proximate the first blade row, wherein the CCFG overlaps the trailing edges and is configured to guide a portion of working fluid in the turbomachine.

13. A turbomachine according to claim 12, further comprising a hub surface and shroud surface, wherein the CCFG is formed in at least one of the hub surface and the shroud surface.

14. A turbomachine according to claim 13, wherein the CCFG includes at least one channel formed in the shroud surface.

15. A turbomachine according to claim 14, further comprising a diffuser located downstream of the first blade row, the diffuser having an inlet and an exit, wherein the at least one channel extends downstream of the diffuser inlet.

16. A turbomachine, comprising:
a hub and shroud forming a diffuser passageway therebetween, the diffuser passageway having an inlet; and
an impeller rotatably disposed adjacent the diffuser, the impeller having a plurality of impeller blades with trailing edges, wherein the trailing edges are located downstream of the diffuser passageway inlet.

17. A turbomachine according to claim 16, further comprising a plurality of diffuser blades having leading edges, wherein a portion of the leading edges are located upstream of the impeller blade trailing edges.

18. A turbomachine according to claim 17, wherein the diffuser blades have a pressure side and a suction side, wherein the leading edges have an asymmetry about a diffuser blade centerline extending from the hub to the shroud, the asymmetry formed by a chamfer on either the pressure side or the suction side of the diffuser blades.

19. A turbomachine according to claim 16, further comprising at least one channel located in the shroud that extends in a flowwise direction and overlaps the trailing edges.

* * * * *